United States Patent [19]

Koss et al.

[11] 3,962,760

[45] June 15, 1976

[54] LAMINATING INTERLAYER EXPANDING APPARATUS

[75] Inventors: George A. Koss, Dearborn Heights; Daniel J. Gurta, Westland, both of Mich.

[73] Assignee: Ford Motor Company, Dearborn, Mich.

[22] Filed: Oct. 21, 1974

[21] Appl. No.: 516,846

[52] U.S. Cl. .................................... 26/72; 156/360; 425/135; 425/366; 26/74; 26/75; 26/106
[51] Int. Cl.² ...................... B29C 24/00; B29F 5/00
[58] Field of Search ................... 264/288, 291, 292; 156/229, 360; 425/66, 135, 141, 363, 366; 26/54, 63, 68

[56] References Cited
UNITED STATES PATENTS

| | | | |
|---|---|---|---|
| 2,750,986 | 6/1956 | Russell et al. | 425/141 |
| 2,933,759 | 4/1960 | Startzell | 26/54 |
| 3,019,475 | 2/1962 | Smith | 425/335 |
| 3,265,786 | 8/1966 | Voelker | 425/141 |
| 3,341,888 | 9/1967 | Bridge et al. | 425/363 |
| 3,510,374 | 5/1970 | Walker | 156/360 |
| 3,696,186 | 10/1972 | Stark et al. | 264/291 |
| 3,782,873 | 1/1974 | Lynnknowles | 425/141 |
| 3,885,899 | 5/1975 | Koss et al. | 425/150 |

Primary Examiner—Douglas J. Drummond
Assistant Examiner—Basil J. Lewris
Attorney, Agent, or Firm—William E. Johnson; Keith L. Zerschling

[57] ABSTRACT

An apparatus for expanding a laminating interlayer is disclosed. The apparatus includes structure for feeding a heated web of laminating interlayer material to a conical member. A stretching of the web occurs between the feeding structure and the conical member. The web is cooled on the conical member. The apparatus also includes structure which maximizes the yield from the web being stretched.

3 Claims, 5 Drawing Figures

LAMINATING INTERLAYER EXPANDING APPARATUS

BACKGROUND OF THE INVENTION

U.S. Pat. No. 3,696,186 issued on Oct. 3, 1972 for a Method of Expanding Pliable Material teaches structure for expanding vinyl material which is used as an interlayer in laminating glass templets together in order to form an automotive windshield. This patent also discloses a structure for accomplishing the method described in the patent. This patent and U.S. Pat. Nos. 2,933,759 and 3,019,475 disclose methods and apparatuses for stretching a plasticized polyvinyl-butyral web used to form the interlayer of an automotive windshield. The stretching of such material is desirable when a tinted band is placed along one lateral edge of the material so that the material may be used in the formation of a tinted windshield for an automotive vehicle. More particularly, the tinted or gradient band is located at the top of the windshield in order to reduce the light transmission capability of the windshield in that area. This reduction in light transmission aids the operator of the vehicle by reducing the amount of glare he is subject to, thereby improving his field of vision.

When the gradient band windshield has both horizontal and vertical curvature, it is necessary to stretch each interlayer prior to placing it between two glass templets. This stretching is necessary so that upon lamination of the two glass templets with the interlayer, the edge of the gradient band across the windshield will appear as a straight line when the windshield is assembled in an automobile. In its stretched condition, the interlayer will have the lateral edges thereof formed into curved configurations with different arc lengths. To facilitate the manufacture of the interlayer material, the material is produced in large rolls with the lateral edges thereof in a parallel and straight condition. Many individual interlayers may be formed from one such large roll of material.

The patents mentioned above show methods and apparatuses for stretching the original continuous length of interlayer material into a stretched condition to make it acceptable for use in a laminating procedure. The apparatus of this invention is an improvement over the apparatuses known in the prior art in that the present apparatus assures that a maximum yield is achieved from the roll of material being stretched.

SUMMARY OF THE INVENTION

This invention relates to an apparatus for expanding a laminating interlayer and, more particularly, to such an apparatus which obtains a maximum yield from a roll of material being stretched.

In accordance with the teachings of this invention, the apparatus includes a feeding device for feeding a continuous web of laminating interlayer material from a supply thereof. A heating device is associated with the feeding device for heating the web to a temperature whereat it is pliable. A cooling cone structure is provided both for applying a stretching force to and for cooling the web. The cooling cone structure includes a motor for driving the same. Structure is provided for mounting the cooling cone structure adjacent the feeding and heating devices. A first measuring device is positioned between the cooling cone structure and the heating device to measure the thickness of the web and to develop a signal indicative of the measured thickness. A second measuring device, also located between the cooling cone structure and the heating device, measures the width of the web and develops a signal indicative of its measurement. A variable power source is provided which controls the rotational speed at which the motor driving the cooling cone structure runs. A control circuit structure is responsive to the signals indicative of the thickness and the width of the web. This controls circuit structure is connected by circuit connections to the variable power source so that the signals developed by the first and second measuring devices are utilized to control the rotational speed of the motor driving the cooling cone structure thereby to provide control signals to the motor which maximize the yield from a roll of material being stretched.

DESCRIPTION OF THE PREFERRED EMBODIMENT

Construction

In the formation of an automotive safety windshield, a pair of glass templets are laminated together with an interposed sheet of a plasticized polyvinyl-butyral. The glass templets have an approximate thickness of 0.100 inch and the interlayer has a thickness of approximately 0.030 inch. The formation of such a laminated assembly is well known in the art. In many cases, it is desirable to include in the laminating interlayer a darkened or gradient tint band at the top portion thereof to reduce the amount of light which is allowed to enter into the automotive vehicle through the top portion of the windshield. This particular band is generally known as the gradient band and is preferably graduated with the intensity of coloration decreasing from the top of the windshield to a position spaced from the bottom thereof. Because most modern day automotive windshields have both a horizontal and a vertical curvature thereto, it is necessary to stretch the gradient vinyl to the proper curvature prior to laminating the vinyl with a pair of glass templets. More particularly, in order that the end of the gradient tint line in the windshield appear as a uniform horizontal line when the windshield is installed in an automotive vehicle, it is necessary to stretch the interlayer material so that the upper and lower edges thereof have a proper radius of curvature prior to lamination of the material. When the material is stretched, the lower portion of the gradient band is not horizontal. However, when the windshield is installed in an automotive vehicle, the angle of installation of the windshield is such that the bottom of the band will appear as a straight line when viewed from the exterior of the automotive vehicle.

The vinyl material used for the interlayer, as purchased, is in a continuous roll wherein the opposite lateral edges thereof are in substantially parallel relationship. As a final expanded product, finite lengths of the interlayer are formed from the roll in such a configuration that the upper and lower lateral edges of the interlayer are stretched to curved configurations of different arc lengths. The upper edge of the gradient band interlayer is of a smaller arc length than the lower edge thereof.

Figure 1:
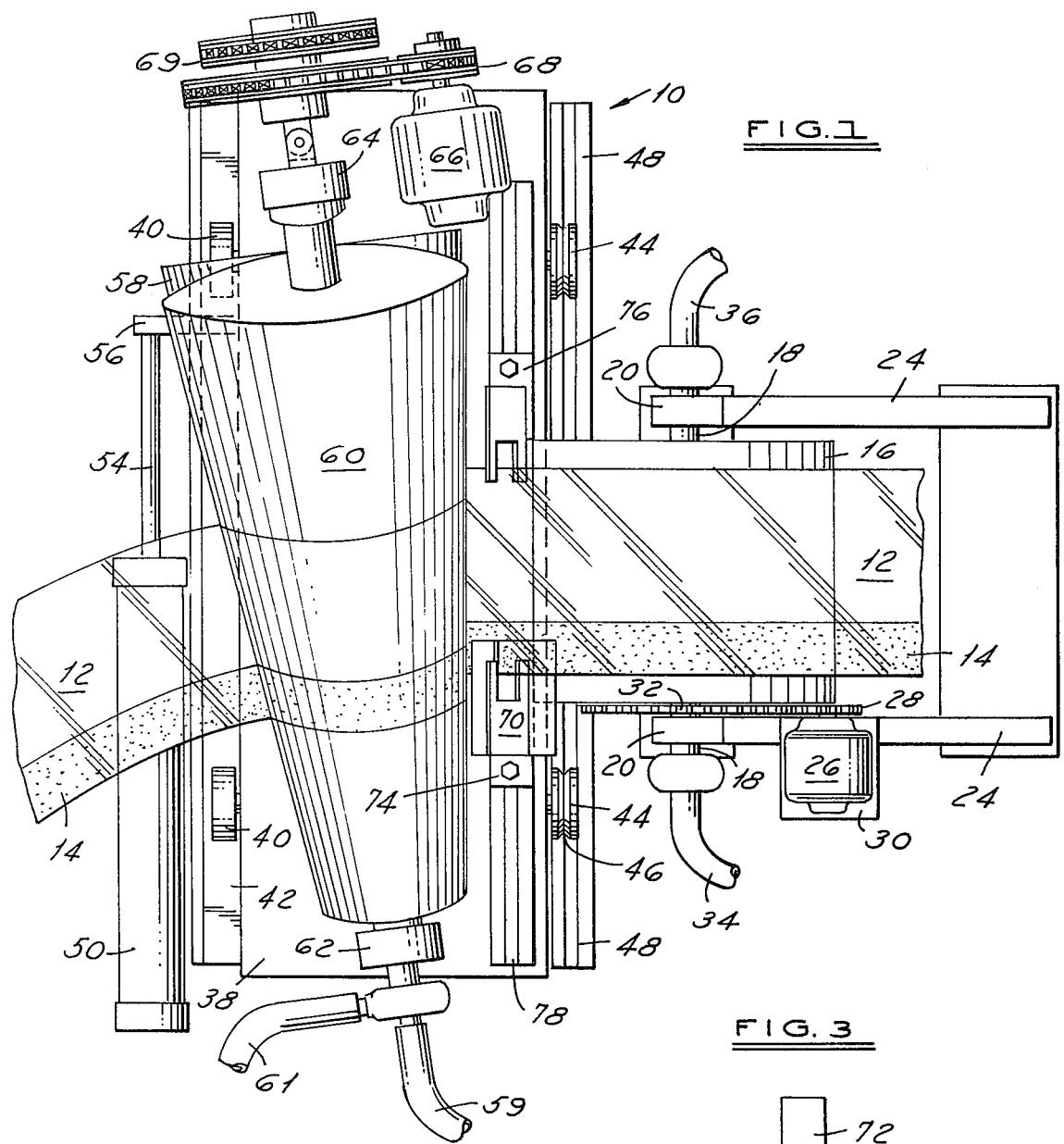
FIG. 1 is a plan view of apparatus embodying the principals of this invention.
Figure 3:
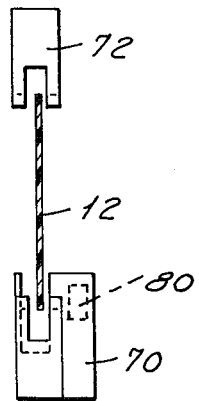
FIG. 3 is a view taken along line 3—3 of FIG. 2.
Figure 2:
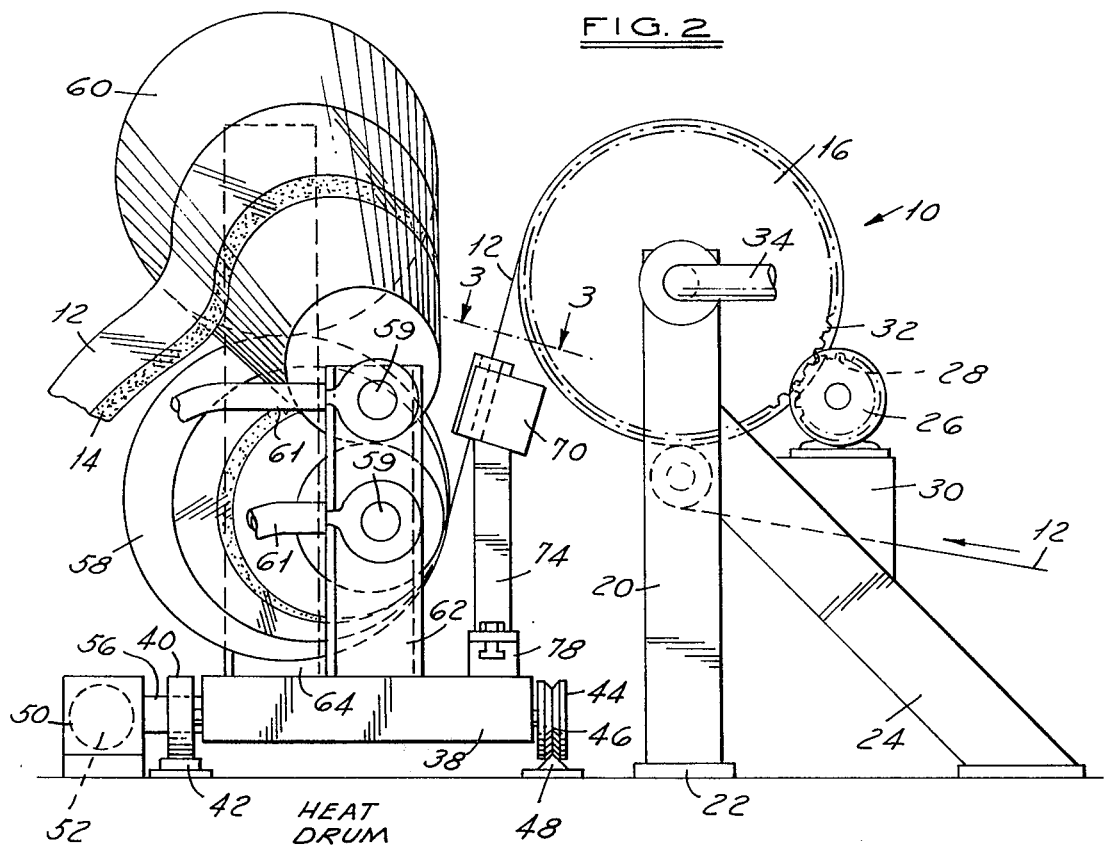
FIG. 2 is a side elevation view of the apparatus of FIG. 1.

The apparatus of this invention for achieving a maximum yield of stretched material will be best understood by reference to the associated drawings wherein the apparatus is generally identified by the numeral 10. With reference to FIGS. 1 and 2 of the drawings, a continuous roll of commercially available, polyvinyl-butyral 12 is shown as it is unwound from a coil thereof (not shown). The roll of vinyl is formed so that one edge thereof has a gradient tinted band 14 therealong. The vinyl material is unrolled and pulled through a plurality of rinsing solutions at a rinsing station (not shown). At such a rinsing station, water is used to wash from the surface of the vinyl fine dust material which is placed thereon in order to keep the various convolutions of the material in the roll separate during its handling and shipping.

After passing through the rinsing station, the web 12 is passed around a drum 16 which is mounted for rotation on a shaft 18 which in turn is supported by a pair of upstanding members 20. The upstanding members are secured to a base plate 22 and are further supported by brace members 24. A motor 26 is provided which drives a gear 28. The motor is mounted on support structure 30 associated with one of the brace members 24. The gear 28 engages a gear 32 secured to the drum 16.

The shaft 18 supporting the drum 16 has a hollow interior and only extends a portion of the way into the drum on each side thereof. The drum itself is completely enclosed. An inlet pipe 34 and an exhaust pipe 36 are connected at opposite ends of the shaft 18 so that a heating medium, such as steam, may be supplied to the interior of the drum. The heating medium is effective to heat the vinyl material which is passing over the surface of the drum.

Adjacent to the stationarily mounted drum 16 and heating structure therefor, is a movable platform 38. As best seen in FIGS. 1 and 2, the left side of the movable platform has a pair of support wheels 40 which are movable over a track 42. The right side of the movable platform is supported by guide wheels 44 having a groove 46 therein which locates the wheels on a guide track 48. An hydraulic cylinder 50 operates a piston 52 which has a rod 54 associated therewith. The rod has a coupling member 56 which connects it to the movable platform. The hydraulic cylinder, by movement of the piston, is effective to operate the movable platform to position it in different positions with respect to the stationary drum 16. The manner in which the cylinder 50 is operated to cause movement of the platform is described in U.S. Pat. No. 3,885,899 issued May 27, 1975 for Apparatus For Expanding a Laminating Interlayer.

A lower cooling cone 58 and an upper cooling cone 60, both truncated, are shown in the drawings as being rotatably mounted by a front standard 62 and a rear standard 64 to the movable platform 38. While two cooling cones are shown in the drawings, any number of cooling cones may be employed with the apparatus of this invention. The cooling on these cones is carried out by allowing cooling fluid to flow through the cones through inlet pipe 59 and be removed therefrom through exhaust pipe 61. As shown in FIG. 1, a motor 66 has a chain drive 68 associated therewith. The chain drive 68 drives the lower cooling cone 58 and a second chain drive 69 driven by a reversing gear on the lower cooling cone drives the upper cone so that both cones are driven at a desired rotational speed. The motor and chain drives are secured to the movable platform for movement therewith.

As is also best seen in FIG. 1, a first gaging head 70 and a second gaging head 72 are mounted by posts 74 and 76 respectively on the movable platform 38. The gaging heads may be moved any place along a gaging track 78 so as to accommodate the width of vinyl passing therethrough. The gaging heads may be adjusted so that they are associated with different positions along the slant height of the cones 58 and 60. The gaging heads are adjusted by loosening bolts which secure their posts to the gaging track.

The gaging head 70 is designed to locate the edge of the web and to keep it in a particular fixed position with respect to a location on the cooling cones which has been selected for stretching the vinyl to a particular configuration having certain desired upper and lower radii of curvature. The particular manner in which the gaging head 70 accomplishes this function is fully described in our above identified patent. For the purposes of this application, no further description of the gaging head will be given but it will be assumed that it operates effectively to maintain the edge of the web having the tinted band therealong in an exact fixed position with respect to the head whereby the edge may be used as a reference for measuring the width of the vinyl as will be described in greater detail hereinbelow.

The web of polyvinyl-butyral, as purchased generally has a web thickness slightly greater than 0.030 inch. In fact it has been found that the web thickness may be as high as 0.033 inch with a great deal of variation in the thickness of the ribbon along its length. As will be recalled, the proper interlayer thickness for laminating is 0.30 inches and the apparatus of this invention has been so designed that it will stretch the web sufficiently between the heating drum 16 and the first cooling cone 58 to reduce the thickness of the web from a level above the 0.30 mark to the desired thickness. By reducing the thickness, a greater yield is achieved from the roll than would be if no reduction in web thickness was achieved. In reducing the web thickness, the width of the ribbon is also reduced because of the added pulling force on the pliable vinyl material. The final product must have at least a minimum width. Therefore the apparatus of this invention is designed to apply an added stretching force to an overly thick vinyl web but is also designed not to apply a force which would result in a final ribbon having a width less than desired. Thus the primary control on the apparatus is the thickness control and as long as the stretched vinyl has a width more than the minimum width, the apparatus will be effective to reduce the thickness of the vinyl to the most desirable level of 0.030 inches. The structure for accomplishing this desirable feature will now be discussed.

Figure 4:
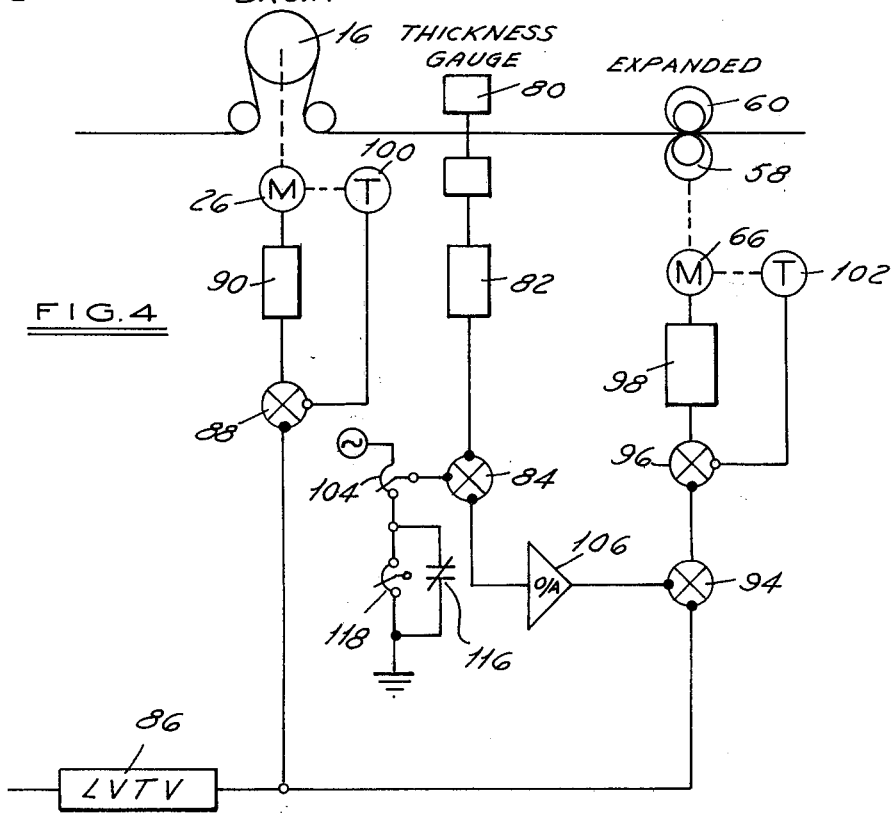
FIG. 4 is a schematic drawing of the control circuit used with the apparatus.

The first gaging head 70 contains a beta gauge 80, known in the art, which measures the thickness of the web 12 passing through the gaging head. The signal developed by the beta ray gauge, the signal being developed by the attenuation of the beta ray because of the thickness of the vinyl, is fed to a beta gauge control panel 82. The signal developed from the panel 82 is applied to a summing junction 84. As is best seen in FIG. 4, a line speed reference voltage 86 is provided. This voltage source is applied to a summing junction 88 which in turn controls an electrical control system 90 controlling the variable speed motor 26 associated with the heat drum 16. The line speed reference voltage 86 is also applied to a summing junction 94. The summing junction 94, in turn, is connected by appropriate circuitry to a summing junction 96 associated with an electrical control system 98 which controls the speed of the variable speed motor 66 associated with the upper and lower cooling cones.

A tachometer 100 is associated with the motor 26 to measure its rotational speed. The output of this tachometer is applied to the summing junction 88 in order to provide an error signal which is used in the control circuitry 90 to develop the proper rotational speed in the motor 26 in accordance with principals well known in the art. A tachometer 102 is similarly provided in the motor control circuit for the motor 66.

As previously stated, the signal developed from the beta ray control panel 82 is provided to the summing junction 84. An adjustable reference signal device 104 provides a signal to the summing junction 84 indicative of the desired thickness. The signal from the beta ray gauge and from the signal device 104 are compared on a subtractive basis to determine if there is any error signal indicative of a thickness greater than that desired. The error signal is applied to an operational amplifier 106 which in turn applies the amplified error signal to the summing junction 94. If the gauge 80 indicates a too thick web passing therethrough, a positive signal results from the amplifier to the summing junction 94, which signal is summed with the line speed reference voltage to provide a greater voltage to summing junction 96. By this action, the speed of the motor 66 is increased. The increase in the speed results in a thinning of the web as will be explained hereinbelow.

Figure 5:
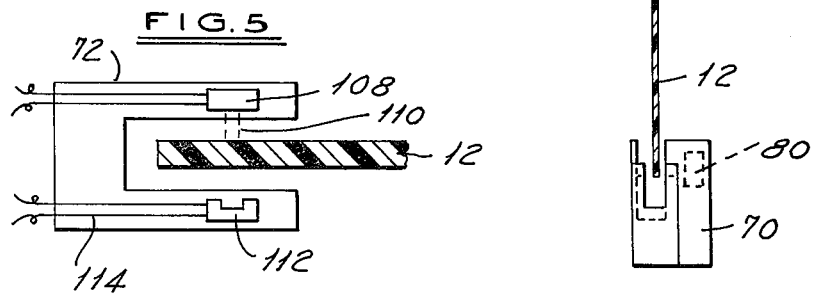
FIG. 5 is a schematic drawing of an edge measuring device utilized with the apparatus.

Gaging head 72 is shown in detail in FIG. 5. The gaging head contains a light source 108 which projects a beam of light 110 onto the web 12. Below the web is located a photocell 112. If the web is removed from its position between the light source and the photocell, the photocell is actuated and supplies the signal on a lead 114. The lead 114 is connected to a normally closed relay 116 (FIG. 4) which is in parallel with a second adjustable reference signal device 118 which, in turn, is in series with the adjustable reference signal device 104. When the photocell 112 is actuated by impingement of light thereon, normally closed relay 116 opens thereby placing the second adjustable reference device 118 in series with the first adjustable reference signal device to achieve a function which will be described hereinbelow.

OPERATION

The operation of the apparatus of this invention will now be described in detail. In the description, no movement of the movable platform will be described as that is contained in our previously mentioned patent. It will also be assumed that the edge of the web 12 having the gradient band 14 therealong is located in a relatively fixed position in the first gaging head 70 by the mechanism also described in our previously mentioned patent.

As previously stated, the purpose of this apparatus is to maximize the yield obtainable from a particular roll of web material, which web would have the variable thickness throughout the length thereof. By stretching the web so as to reduce the thickness thereof to that particularly desired, a maximum amount of material is derived from the roll of material. It is of course to be understood that the finished product must have at least a minimum width. Therefore, if the minimum width is achieved and the thickness is greater than that desired, the apparatus of this invention will limit the stretching force so that the desired minimum width is maintained even though greater stretching pressure can be applied to thin the web.

The web 12 passes from the rinsing station, not shown, over an idler roller and onto the surface of the drum 16. The drum 16 is rotated through the motor 26 operating on gears 28 and 32. The speed of this motor is monitored by the tachometer 100 and the electrical control system 90 operates in conjunction with this monitoring to maintain the speed of the motor at that produced by the voltage applied at the junction 88. With this driving action the web is pulled from its continuous supply through the rinsing station and on to the surface of the drum. As is apparent from FIG. 2, the web is in contact with the drum surface along a substantial length thereof. During this contact, the web is heated to a temperature in the range of about 220°F by introducing a heating fluid such as steam under pressure through the inlet pipe 34 to the interior of the drum. The heating fluid is effective to heat the vinyl to a temperature whereat it is in a more pliable condition. The heating medium is exhausted from the interior of the drum through the exhaust pipe 36. The web reaches its highest temperature at a point approximately where it is removed from the surface of the drum 16. At this point the vinyl web is pliable enough to be stretched.

The pliable web 12 is stretched between the point it leaves the surface of the drum to the point at which it comes into contact with the lower cooling cone 58. The stretching force of the lower cooling cone is developed from the motor 66 acting through the chain drive 68 to drive the cooling cone. The motor 66 the tachometer 102 associated therewith to maintain the speed of the motor in accordance with the voltage applied to the junction 96. In order to have a pulling action, the motors 26 and 66 normally drive their associated equipment such that the surface speed of the cooling cones is slightly greater than the surface speed of the heat drum. In such a case there is a pulling action between the drum and the first cooling cone.

In passing from the two points above discussed, the web passes through the gaging head 70 in which the beta gauge 80 is placed. The beta gauge 80 produces a constant readout indicative of the thickness of the web passing therethrough. The readout is developed in the beta control panel 82 and is applied to the summing junction 84. The adjustable reference signal device 104 is preset to give a reference signal which is indicative of a selected thickness in the vinyl material. For example, the reference signal may be set so that it is indicative of .030 inch. The signal from the adjustable reference signal device 104 is compared on a plus minus basis with the signal developed from the thickness gauge. Thus if the signal from the thickness gauge is for 0.030 inch, the result of the two signals would be zero. If the signal from the thickness gauge is for 0.033, an error signal representative of 0.003 inch would be developed and applied to the operational amplifier 106. The operational amplifier, in turn, applies the amplified error signal indicative of the excess thickness of the vinyl, if any, to the summing junction 94. This additional signal, when added to the normal signal applied to the summing junction 94 from the line speed reference voltage 86, is applied to the summing junction 86 causing the motor 66 associated with the cones to run faster increasing the surface speed of the cone. This action applies a greater stretching force to the vinyl web between the two previously mentioned points. This greater stretching force, of course, acts in two manners, (1) it reduces the thickness of the vinyl and (2) it reduces the width of the vinyl. As long as the vinyl is greater than the desired width, the motor 66 will continue to increase its speed thereby reducing the thickness of the vinyl until such time as the thickness reaches the desired 0.030 inches producing a null in junction 84 of operational amplifier 106.

As previously described, the second gaging head 72 contains the the light source 108 and the photocell 112. If at any time while the thickness measured is greater than that desired, and an edge of the web 12 blocks off the light 110 between the source and photocell, the motor 66 of the expander will have its speed increased so as to reduce the thickness of the web. However, if the edge of the web comes out of blocking relationship with the light source, the light impinges on the photocell. This action causes the normally closed relay 116 to open and the adjustable reference device 118 to be placed in series with the first adjustable reference device 104 to give a different standard reading to the summing junction 84. For example, the second adjustable reference device could add a signal representative of 0.002 inch to the first signal. This action would change the signal on the summing junction 94 whereby the speed of the motor 66 would be reduced and the thinning of the web slowed down thus resulting in a subsequent widening of the web to the point where it once again blocks the light source.

In the above described manner, the apparatus of this invention is effective to maximize the amount of material which is derived in a vinyl stretching operation. The apparatus also insures that the maximization of yield does not produce a ribbon having a width less than desired.

In view of the above disclosure, those skilled in the art will be able to make many modifications thereof which fall within the scope of the appended claims. It is intended that all such modifications which fall within the scope of this invention be included within the scope of the appended claims.

We claim:

1. An apparatus for expanding a laminating interlayer which comprises:
   feeding means for feeding a continuous web of laminating interlayer material from a supply thereof;
   heating means for heating said web to a temperature whereat it is pliable;
   cooling cone means including a motor driving the same both for applying a stretching force to and for cooling said web;
   structure means for mounting said cooling cone means adjacent said feeding means and said heating means;
   first measuring device means for measuring the thickness of said web between said heating means and said cooling cone means for developing a signal indicative of the measured thickness;
   second measuring device means for measuring the width of said web between said heating means and said cooling cone means and for developing a signal indicative of the measured width;
   controllable power source means for variably controlling the speed of said motor driving said cooling cone means in accordance with a control signal applied thereto;
   control circuit means responsive to said signals indicative of thickness and width of said web for developing a control signal for application to said controllable power source means, said control circuit means (1) increasing said control signal when said signal indicative of thickness is above a predetermined thickness level and said signal indicative of width is above a predetermined width level, (2) not increasing said control signal even though said signal indicative of thickness is above a predetermined thickness level when said signal indicative of width is at or below said predetermined width level, (3) maintaining said control signal when said signal indicative of thickness is at said predetermined thickness level and said signal indicative of width is at or above said predetermined width level, and (4) reducing said control signal when said signal indicative of width is below said predetermined width level; and
   circuit means for connecting said first and said second measuring means to said control circuit means whereby changes in the thickness and the width are used to control the rotational speed of said motor of said cooling cone means.

2. The apparatus of claim 1 wherein: said cooling cone means includes more than one cooling cone.

3. Apparatus for expanding a laminating innerlayer which comprises:
   a drum;
   first structure means for mounting said drum for rotation;
   a motor rotatably driving said drum to draw over a major portion of said drum's surface a continuous web of laminating innerlayer material from a supply thereof;
   heating means for supplying a heating fluid internally of said drum to heat said web as it passes over said surface of said drum to a temperature whereat said material of said web is pliable;
   a cooling cone having a slant height greater than the width of said web;
   a platform;
   second structure means for rotatably mounting said cooling cone on said platform;
   a motor rotatably driving said cooling cone so that said cone applies a stretching force to said web as said web moves from said drum to said cone;
   cooling means for supplying a cooling fluid internally of said cooling cone to cool said web as it passes over the surface of said cooling cone;
   first measuring device means for measuring the thickness of said web and for developing a signal indicative of the measured thickness;
   second measuring device means for measuring the width of said web and for developing a signal indicative of the measured width;
   third structure means for mounting said first and said second measuring device means at a location between said drum and said cooling cone;

controllable power source means for variably controlling the speed of said motor driving said cooling cone in accordance with a control signal applied thereto;

control circuit means responsive to said signals indicative of thickness and width of said web for developing a control signal for application to said controllable power source means, said control circuit means (1) increasing said control signal when said signal indicative of thickness is above a predetermined thickness level and said signal indicative of width is above a predetermined width level, (2) not increasing said control signal even though said signal indicative of thickness is above a predetermined thickness level when said signal indicative of width is at or below said predetermined width level, (3) maintaining said control signal when signal indicative of thickness is at said predetermined thickness level and said signal indicative of width is at or above said predetermined width level, and (4) reducing said control signal when said signal indicative of width is below said predetermined width level; and circuit means for connecting said first and said second measuring means to said control circuit means whereby changes in the thickness and the width are used to control the rotational speed of said motor of said cooling cone means.

* * * * *